US012736124B2

(12) United States Patent
Bietz et al.

(10) Patent No.: US 12,736,124 B2
(45) Date of Patent: Sep. 15, 2026

(54) TRANSMISSION, IN PARTICULAR FOR A MOTOR VEHICLE

(71) Applicant: Mercedes-Benz Group AG, Stuttgart (DE)

(72) Inventors: Benno Bietz, Waiblingen (DE); Eugen Schwarzenberger, Stuttgart (DE); Ralph Burkart, Pfinztal (DE); Stefan Sprigade, Freiberg (DE); Andreas Baer, Lampertheim (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 19/128,846

(22) PCT Filed: Oct. 26, 2023

(86) PCT No.: PCT/EP2023/080007
§ 371 (c)(1),
(2) Date: May 9, 2025

(87) PCT Pub. No.: WO2024/104759
PCT Pub. Date: May 23, 2024

(65) Prior Publication Data

US 2026/0177140 A1 Jun. 25, 2026

(30) Foreign Application Priority Data

Nov. 18, 2022 (DE) ..................... 10 2022 004 266.5

(51) Int. Cl.

| | |
|---|---|
| ***F16H 57/04*** | (2010.01) |
| ***F16D 25/0638*** | (2006.01) |
| ***F16H 3/00*** | (2006.01) |

(52) U.S. Cl.
CPC ..... *F16H 57/0426* (2013.01); *F16D 25/0638* (2013.01); *F16H 3/006* (2013.01); *F16H 57/0424* (2013.01); *F16H 57/0494* (2013.01)

(58) Field of Classification Search
CPC ............. F16H 57/0424; F16H 57/0423; F16D 2300/26; F16D 13/72; F16D 13/74
See application file for complete search history.

(56) References Cited

U.S. PATENT DOCUMENTS

| | | | | |
|---|---|---|---|---|
| 2009/0205924 | A1 | 8/2009 | Agner et al. | |
| 2017/0191560 | A1 | 7/2017 | Sperrfechter et al. | |
| 2025/0224030 | A1* | 7/2025 | Smith | F16H 57/0424 |

FOREIGN PATENT DOCUMENTS

| | | |
|---|---|---|
| DE | 10 2009 006 647 A1 | 8/2009 |
| DE | 10 2014 007 540 A1 | 11/2015 |

(Continued)

OTHER PUBLICATIONS

International Search Report (PCT/ISA/210) issued in PCT Application No. PCT/EP2023/080007 dated Feb. 13, 2024 with English translation (5 pages).

(Continued)

*Primary Examiner* — Jake Cook
(74) *Attorney, Agent, or Firm* — Crowell & Moring LLP

(57) ABSTRACT

A clutch chamber has a first outlet opening, which is arranged at an about 8 to 10 o'clock position, as viewed in the circumferential direction of the dual-clutch transmission, extending around the axial direction of the dual-clutch transmission, and is provided for direct return of the transmission oil into the transmission housing base area. Furthermore, the clutch chamber has a second outlet opening, which is arranged at an about 2 to 4 o'clock position, as viewed in the circumferential direction of the dual-clutch (Continued)

transmission, and is provided for a return flow of the transmission oil into the transmission housing base area.

8 Claims, 3 Drawing Sheets

(56) References Cited

FOREIGN PATENT DOCUMENTS

| | | | | |
|---|---|---|---|---|
| DE | 102018002172 A1 * | 9/2019 | ......... | F16H 57/0494 |
| DE | 10 2018 004 556 A1 | 12/2019 | | |
| WO | WO 2019/175074 A1 | 9/2019 | | |

OTHER PUBLICATIONS

German-language Written Opinion (PCT/ISA/237) issued in PCT Application No. PCT/EP2023/080007 dated Feb. 13, 2024 with English translation (9 pages).
German-language Office Action issued in German Application No. 10 2022 004 266.5 dated Jun. 27, 2023 (6 pages).

* cited by examiner

TRANSMISSION, IN PARTICULAR FOR A MOTOR VEHICLE

BACKGROUND AND SUMMARY OF THE INVENTION

The invention relates to a transmission, in particular for a motor vehicle.

Such a transmission, designed as a dual-clutch transmission, in particular for a motor vehicle, is already taken as known from WO 2019/175074 A1. The dual-clutch transmission has a transmission housing and a clutch housing. Furthermore, the dual-clutch transmission has a clutch device arranged at least inside the clutch housing, designed as a dual clutch and thus having at least or exactly two clutches, the rotational body of which is enclosed by an outer plate carrier of an outer clutch of the dual-clutch transmission. Furthermore, the dual-clutch transmission has a hollow-cylindrical clutch chamber which at least partially encloses the outer plate carrier of the outer clutch. An electrohydraulic control unit and a wheel set space are also provided, said wheel set space comprising a transmission housing base area with an oil sump. The dual-clutch transmission has a transmission oil reservoir which is provided for receiving transmission oil for the dual-clutch transmission. In other words, the transmission oil, also simply referred to as oil, can be or is received in the transmission oil reservoir. An oil pump is also provided, which is provided for conveying the transmission oil from the oil sump to the electrohydraulic control unit. The dual-clutch transmission is therefore arranged in a spatial volume of the clutch chamber. In other words, for example, the dual-clutch transmission is arranged at least in a partial region of the clutch chamber. The clutch chamber is axially delimited, i.e. in the axial direction of the dual-clutch transmission in the direction of an internal combustion engine by a first cover.

The object of the present invention is to further develop a transmission of the above-mentioned type in such a way that particularly advantageous discharge of the transmission oil, in particular from the clutch chamber, can be implemented.

In order to further develop a transmission, designed for example, as a dual-clutch transmission or triple-clutch transmission, of the type specified herein, in such a way that particularly advantageous discharge of transmission oil, that functions as cooling oil, for example, or is used as cooling oil and is also simply referred to as oil, from the clutch chamber can be implemented, it is provided according to the invention that the clutch chamber has a first outlet opening, which is arranged at an about 8 to 10 o'clock position, in particular as viewed in the circumferential direction of the dual-clutch transmission and thus a dual-clutch of the dual-clutch transmission, extending around the axial direction of the dual-clutch transmission, and is provided for direct return of the transmission oil into the transmission housing base area. Furthermore, the clutch chamber according to the invention has a second outlet opening, which is arranged at an about 2 to 4 o'clock position, as viewed in the circumferential direction of the dual-clutch transmission and thus of the dual-clutch, comprising the outer clutch as a first clutch and an inner clutch as a second clutch, and is provided for a return flow of the transmission oil into the transmission housing base area. Furthermore, it is provided that the clutch chamber has an elliptical outer contour in each case, i.e. in particular for each outlet opening, in a region between about 12 to 2 or 4 o'clock and a region between about 6 to 8 or 10 o'clock. In other words, for example, a respective elliptical outer contour of the clutch chamber is assigned to the respective outlet opening, so that, for example, the transmission oil in particular on its path to the respective outlet opening flows through to the respective elliptical outer contour, assigned to the respective outlet opening, and/or flows along the respective elliptical outer contour, assigned to the respective outlet opening. Therefore, it is provided that the respective elliptical outer contour, assigned to the respective outlet opening, is arranged in the flow direction of the transmission oil flowing to and through the outlet opening upstream of the respective assigned outlet opening, so that the respective outlet opening connects to the respective elliptical outer contour, assigned to the respective outlet opening, in the flow direction of the transmission oil, which flows through the respective outlet opening. The elliptical outer contour, assigned to the first outlet opening, extends into or over a region, as viewed in the circumferential direction of the dual-clutch transmission and thus the dual-clutch, which extends from 12 o'clock to 2 o'clock, in particular from 12 o'clock to 4 o'clock, as viewed in the circumferential direction of the dual-clutch transmission and thus the dual-clutch. The elliptical outer contour, assigned to the second outlet opening, extends into or over a region, as viewed in the circumferential direction of the dual-clutch transmission, which extends from 6 o'clock to 8 o'clock, in particular from 6 o'clock to 10 o'clock, as viewed in the circumferential direction of the dual-clutch transmission. The elliptical outer contour, assigned to the first outlet opening, is also referred to as a first elliptical outer contour, for example, and the elliptical outer contour, assigned to the second outlet opening, is also referred to as a second elliptical outer contour, for example. Expressed again in other words, the first elliptical outer contour extends from about 12 to 2 o'clock, in particular from about 12 to 4 o'clock in the circumferential direction of the dual-clutch transmission, and the second elliptical outer contour for example, extends from about 6 o'clock to 8 o'clock, in particular from about 6 o'clock to 10 o'clock, as viewed in the circumferential direction of the dual-clutch transmission. This allows the transmission oil, in particular after it has been centrifuged by the dual clutch, to be discharged from the clutch chamber via the outlet opening in a particularly advantageous manner. The invention is thus based in particular on the following findings and considerations.

Due to a permanent cooling oil entry into the clutch chamber, wherein the cooling oil entry is an entry of the transmission oil into the clutch chamber and is, for example, in the range from 0.5 to 20 liters/minute inclusive, a high drag power can occur in the clutch chamber if no corresponding countermeasures are taken, in particular due to only a small distance between the dual clutch and the clutch housing, in particular a housing wall of the clutch housing. Compared to conventional solutions, no drain opening for oil removal can be implemented in a clutch chamber at a 6 o'clock position, as on the wheel set side with sump lubrication, the transmission oil, which is also simply referred to as oil and functions or is used as cooling oil, for example, is higher than a lower edge of the clutch chamber in the oil sump, which is also simply referred to as a sump. However, it is advantageous to discharge the oil quickly and without excessive drag above the oil level in the clutch or wheel set space. Furthermore, the oil should enter the sump smoothly and with a low air content and reach an oil suction system. This can be implemented by the invention. The invention enables oil removal from the clutch chamber, i.e. discharging the transmission oil from the clutch chamber via the outlet opening alone by rotating the dual-clutch, i.e. the respective clutch, so that drag-optimised oil removal from the clutch chamber can be implemented in comparison to conventional solutions. The elliptical outlet contours, in particular in interaction with the outlet openings, form advantageous oil removal geometries, in particular in a given small installation space, so that particularly high requirements of efficiency, oil sedation and oil degassing can also be fulfilled. The invention also enables high amounts of cooling oil of the transmission oil to be discharged quickly and efficiently from the clutch chamber. The oil designed and used in particular as clutch cooling oil, is sedated quickly and degassed after discharge. This means a separate suction pump in the clutch chamber can be omitted.

It is conceivable that the entire transmission or amount of cooling oil from the clutch chamber is divided into about half and thus 50% to each outlet opening and thus is in each case half and thus respectively 50% is discharged from the clutch chamber via the outlet openings. Another division is possible without additional effort, so that for example, more than 50% of the amount of cooling oil flows through the first or second outlet opening.

In an advantageous embodiment of the invention, it is provided that a respective oil rib for separating a respective oil flow, which flows through the respective outlet opening, is assigned to the respective outlet opening.

In an advantageous embodiment of the invention, it is provided that a respective channel connects to the respective outlet opening.

In an advantageous embodiment of the invention, it is provided that the respective channel has a longitudinal region tapered in the transmission oil flow direction.

In an advantageous embodiment of the invention, it is provided that the respective channel has a longitudinal region expanding in the transmission oil flow direction.

In an advantageous embodiment of the invention, it is provided that the first outlet opening is arranged geodetically above a balance differential in the installation position of the transmission, wherein an oil path runs around the balance differential back into the oil sump.

In an advantageous embodiment of the invention, it is provided that the transmission housing has a stepped contour with rounded step edges on the outside of the second outlet opening (26) in the region of an oil path back into the oil sump.

In an advantageous embodiment of the invention, it is provided that an oil path guided by a housing after the outlet openings back into the oil sump is at least 10 millimeters, in particular at least 70 millimeters.

For example, it is provided that the stepped contour has at least or exactly one step, in particular with a step depth of at least 10 millimeters.

Further advantages, features and details of the invention can be seen from the following description of a preferred embodiment and from the drawings. The features and combinations of features mentioned above in the description as well as the features and combinations of features mentioned below in the description of the figures and/or shown alone in the figures can be used not only in the combination indicated in each case, but also in other combinations or on their own, without leaving the scope of the invention.

DETAILED DESCRIPTION OF THE DRAWINGS

In the figures, identical or functionally identical elements are provided with the same reference signs.

Figure 5:
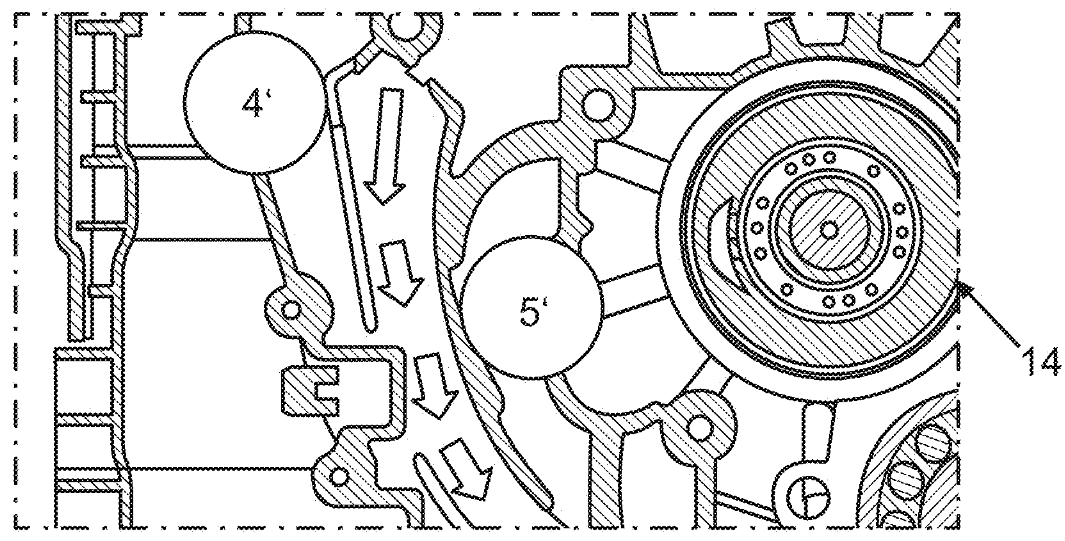
FIG. 5 in part is a further schematic sectional view of dual-clutch transmission.

FIG. 5 shows in part, in a schematic sectional view, a transmission, designed as a dual-clutch transmission 10, in particular for a motor vehicle. The previous and following embodiments can also be transferred for example, onto another transmission, such as a triple-clutch transmission, for example. For example, the motor vehicle can be driven by a drive motor of the motor vehicle via the dual-clutch transmission 10. The drive motor is or comprises, for example, an electric engine and/or an internal combustion engine. The dual-clutch transmission 10 has a transmission housing 12 and a clutch housing 14 and a clutch device, designed in the present case as a dual-clutch, arranged at least inside the clutch housing 14 and not shown in the figures, which has several clutches, for example, in particular exactly two clutches, specifically an inner clutch and an outer clutch. The clutch device could alternatively be designed as a triple-clutch and therefore could have more than two clutches, in particular at least or exactly three clutches. The dual-clutch, the rotational body of which is enclosed by an outer plate carrier of the outer clutch of the dual-clutch transmission 10, is received in a spatial volume of a clutch chamber 18, which is delimited by the clutch housing 14, in particular by an inner circumferential lateral surface of the clutch housing 14. Therefore, the clutch chamber 18 is designed hollow-cylindrical. The clutch chamber 18 at least partially encloses the outer plate carrier of the outer clutch. An electrohydraulic control unit and a wheel set space, not shown in the figures, are also provided, said wheel set space comprising a transmission housing base area with an oil sump. The transmission housing base area is a base region of a base of the transmission housing 12, wherein transmission oil, also simply referred to as oil, can be collected in the oil sump. A transmission oil reservoir is also provided which is provided or designed for receiving the transmission oil for the dual-clutch transmission 10. Also, at least one oil pump is provided, which is provided or arranged for conveying the transmission oil from the oil sump to the electrohydraulic control unit. The clutch chamber 18 is delimited in the axial direction of the dual-clutch transmission in the direction of the internal combustion engine by a first cover. The axial direction of the dual-clutch transmission 10 coincides for example, with a rotational axis 20, in order to be able to rotate the rotational body relative to the clutch housing 14, for example.

Figure 1:
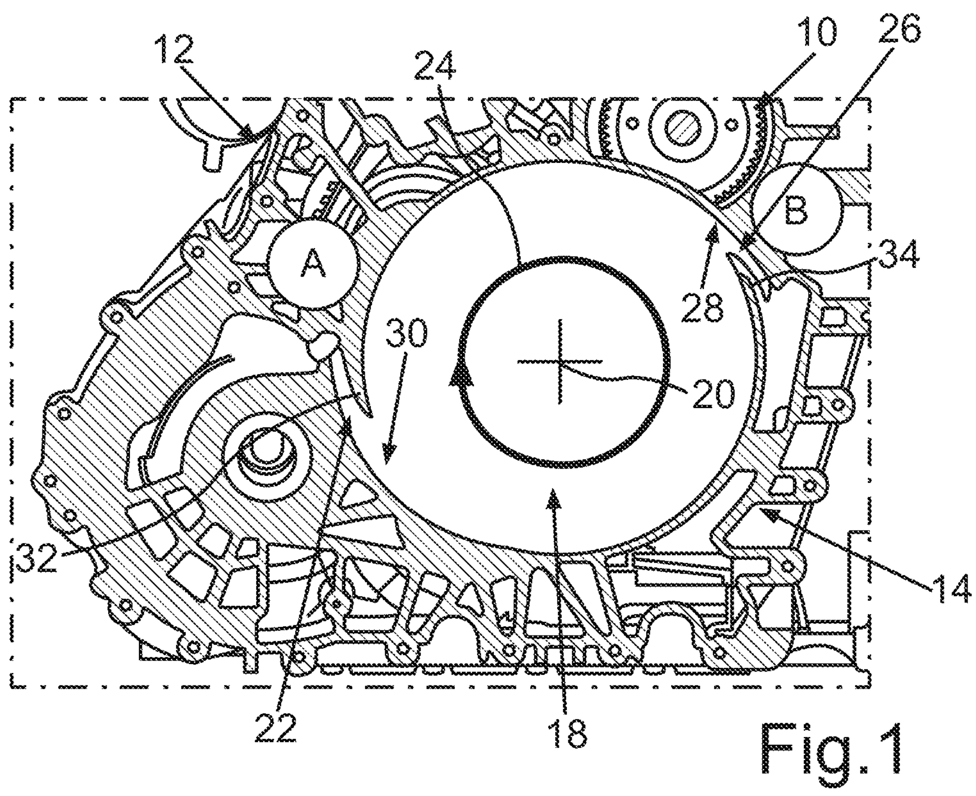
FIG. 1 in part is a schematic sectional view of a dual-clutch transmission.

In order to be able to discharge the transmission oil particularly advantageously from the clutch chamber 18, at least or exactly two so-called recreation areas A and B are provided. In the first recreation area A, a first outlet opening 22 is arranged, which is arranged at an 8 to 10 o'clock position, in particular as viewed in the circumferential direction of the transmission 10 extending around the mentioned rotational axis and is provided for direct return of the transmission oil into the transmission housing base area. The rotational axis is labelled with 20 in FIG. 1, wherein a rotational direction is labelled with 24, in which the rotational body rotates during operation of the dual-clutch transmission 10 relative to the clutch housing 14. The circumferential direction coincides with the rotational direction 24. In the second recreation area B, a second outlet opening 26 is arranged, which is arranged at a 2 to 4 o'clock position, in particular as viewed in the circumferential direction of the transmission 10 and is provided for return flow of the transmission oil into the transmission housing base area. A respective, elliptical outer contour 28, 30 of the clutch chamber 18 is assigned to the respective outlet opening 22, 26. The transmission oil flows on its path to the and through the respective outlet opening 22, 26 through the and/or along the respective, assigned elliptical outer contour 28, 30. It can be seen that the elliptical outer contour 28 extends in a region between 12 to 2 o'clock, in particular between 12 to 4 o'clock, this means it extends from 12 o'clock to 2 o'clock, in particular from 12 o'clock to 4 'clock, as viewed in the circumferential direction of the dual-clutch transmission 10. The elliptical outer contour 30 extends in a region between 6 to 8 o'clock, in particular between 6 to 10 o'clock. In other words, the outer contour 30 extends in the circumferential direction of the dual-clutch transmission 10, as viewed from 6 to 8 o'clock, in particular from 6 to 10 o'clock.

The recreation area A, in particular the outlet opening 22 and the elliptical outer contour 30, enables drag-optimised oil discharge in a region extending from 8 o'clock to 10 o'clock or from 6 o'clock to 10 o'clock. Acceleration of the transmission oil, also simply referred to as oil, and deflection of the oil, i.e. an oil flow formed by the oil, can be implemented. Sedation and degasification can be represented, as, for example, the oil is conveyed outwards and upwards by rotation, and accelerated, deflected, sedated and degassed and then returned to the sump. The recreation area B and thus the outlet opening 26 and the outer contour 28 enable a drag-optimised oil discharge at 2 to 4 o'clock or 12 to 4 o'clock as well as accelerating the oil, sedating the oil, and degassing, in particular by step-like or stepped contour. For example, the oil is conveyed outwards and downwards by rotation and decelerated, sedated and degassed and returned back to the sump via the step-like contour.

Figure 2:
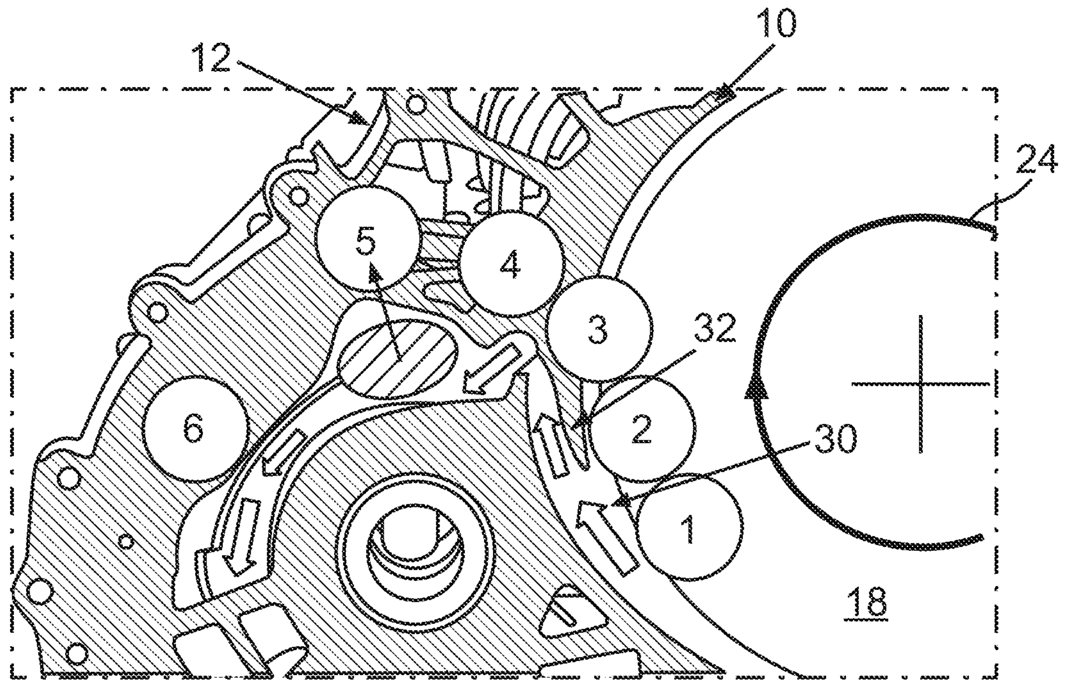
FIG. 2 in part is a further schematic sectional view of dual-clutch transmission.
Figure 3:
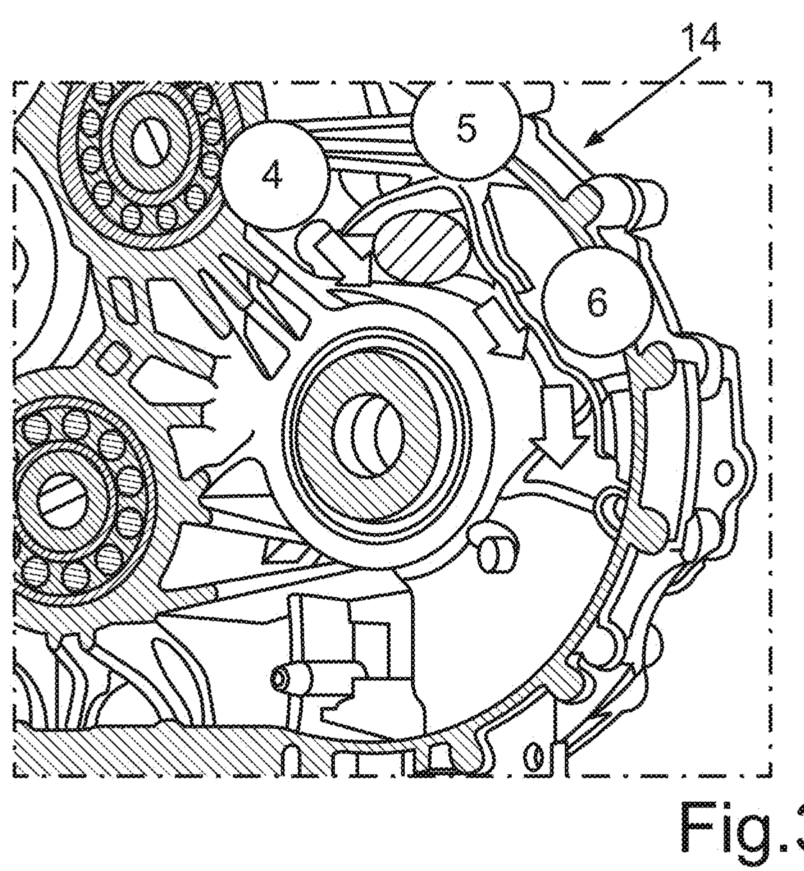
FIG. 3 in part is a schematic and partially sectioned perspective view of the dual-clutch transmission.

Respective points of the recreation area A are labelled with 1, 2, 3, 4, 5 and 6 in FIGS. 2 to 3. These points 1-6 are explained in the following: At point 1, oil discharge from the clutch chamber 18 occurs by means of the elliptical outer contour 30, in particular whereby a laminar flow can be induced at an outer edge of the clutch chamber 18. At point 2, separation of the oil or of the oil flow occurs by an oil rib 32, in particular in an outlet region. At point 3, a cross-section reduction occurs in a second channel, connecting to the outlet opening 26, which can be flowed through by the oil that flows through the outlet opening 26. The cross-section reduction causes oil acceleration shortly before deflecting the oil or oil flow that flows through the outlet opening 22 and through the outer contour 30 or flowing along the outer contour 30. At point 4, oil deflection occurs through a semi-circular geometry, in particular in a channel roof of the second channel, in particular with oil ribs located below, whereby the oil flow changes its direction, in particular flow direction, and all of the oil can flow behind the rib. At point 5, a cross-section enlargement occurs in the second channel for oil deceleration, thus the oil can be sedated and degassed. At point 6, further discharge of the oil occurs via a relatively long path, whereby further oil sedation and oil degassing can be implemented before entering the housing base area.

Figure 4:
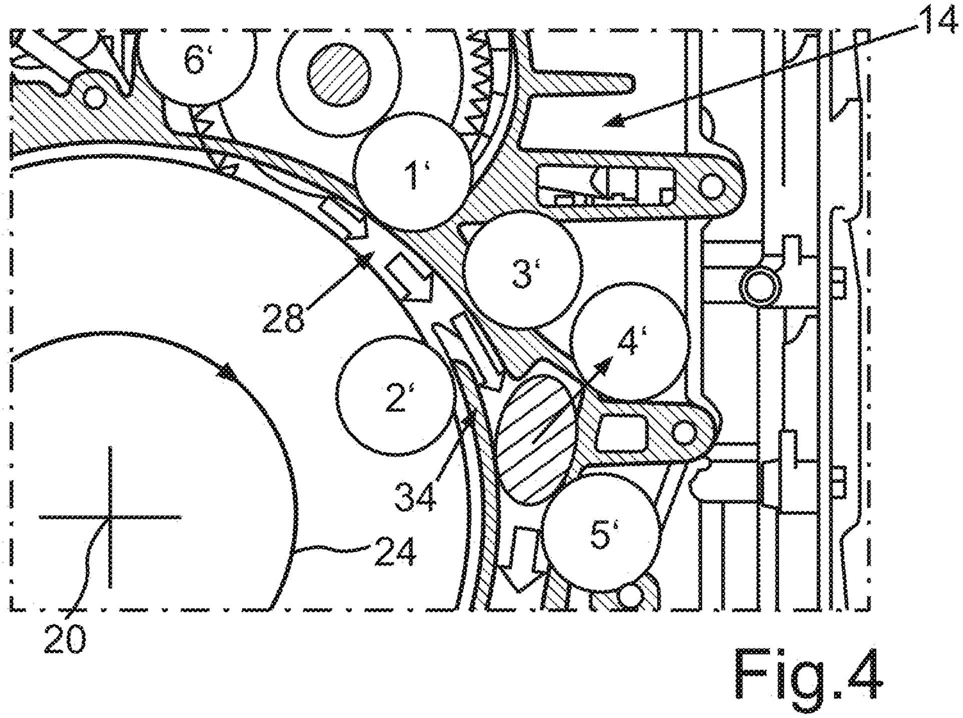
FIG. 4 in part is a further schematic sectional view of dual-clutch transmission.
Figure 6:
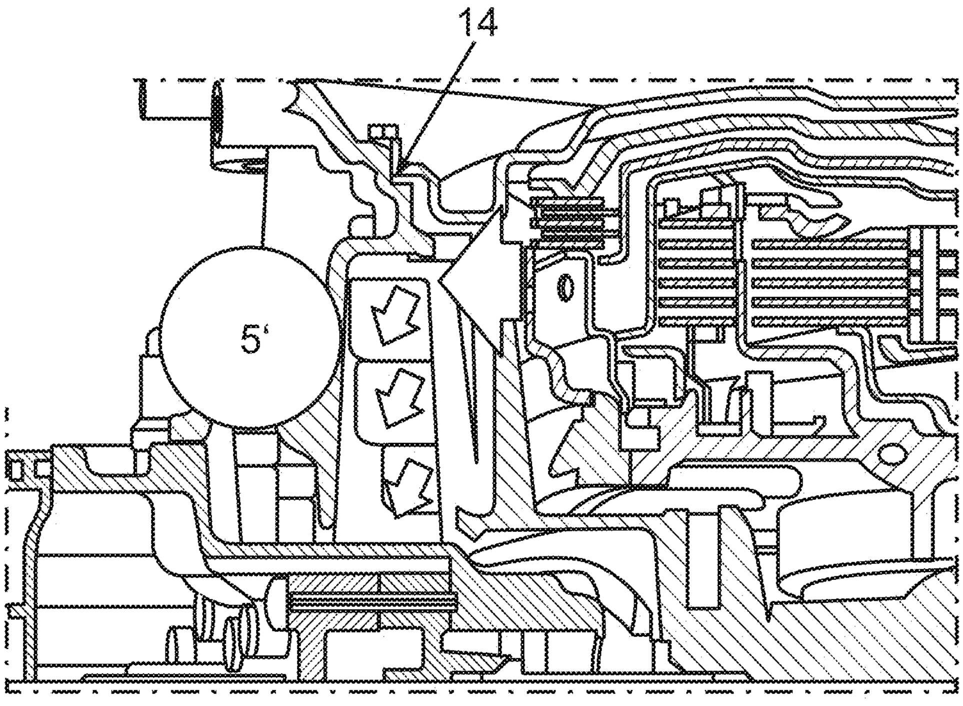
FIG. 6 in part is a further schematic sectional view of dual-clutch transmission.

Individual points of the recreation area B are labelled with 1', 2', 3', 4', 5' and 6' in FIGS. 4 to 6. These points 1'-6' are explained in the following. At point 1', oil discharge from the clutch chamber 18 occurs with the aid of the elliptical outer contour 28. At point 2, separation of the oil flow into an oil sedation region occurs, in particular by an oil rib 34, in particular in an outlet region. At point 3', a cross-section reduction occurs in a first channel, in particular connecting to the outlet opening 26, through which the oil flowing through the outlet opening 26, i.e. an oil flow formed by oil flowing through the outlet opening 26 and an oil flow flowing through the outlet opening 26, can flow. The cross-section reduction in the first channel provides oil acceleration, in particular to an outlet. At point 4', a cross-section enlargement of the first channel or in the first channel occurs for oil deceleration, thus the oil can be sedated and degassed. At point 5', further discharging oil occurs via relatively long path, in particular via or with the aid of a step-like contour, also referred to as a stepped contour, which has at least or one step. This means that further oil sedation and oil degassing can occur, in particular before the oil enters into the sump and therefore in particular below the last, step of the step-like contour, also referred to as a step. At point 6', additional use of outlet geometry can occur in the coupling space 18 for fast oil discharge, which has been or is injected into a toothing region of the electric engine or reaches a spur gear on one of the clutches in an outlet contour on a tooth grip of a pinion of the electric engine.

LIST OF REFERENCE CHARACTERS

- 10 dual-clutch transmission
- 12 gear housing
- 14 clutch housing
- 18 clutch chamber
- 20 rotational axis
- 22 first outlet opening
- 24 rotational direction
- 26 second outlet opening
- 28 elliptical outer contour
- 30 elliptical outer contour
- 32 oil rib
- 34 oil rib
- 1,1' point
- 2,2' point
- 3,3' point
- 4,4' point
- 5,5' point
- 6,6' point
- A recreation area
- B recreation area

The invention claimed is:

1. A transmission (10), comprising:

a transmission housing (12);

a clutch housing (14);

a clutch device disposed at least inside the clutch housing (14) and having at least two clutches, wherein the at least two clutches include an inner clutch and an outer clutch, wherein a rotational body of the clutch device is enclosed by an outer plate carrier of the outer clutch, wherein clutch device is disposed in a spatial volume of a clutch chamber (18), and wherein the clutch chamber (18) at least partially encloses the outer plate carrier of the outer clutch and is axially delimited by a first cover;

an electrohydraulic control unit;

a wheel set space which comprises a transmission housing base area with an oil sump;

a transmission oil reservoir, wherein a transmission oil for the transmission (10) is receivable in the transmission oil reservoir; and at least one oil pump, wherein the transmission oil is conveyable by the at least one oil pump from the oil sump to the electrohydraulic control unit;

wherein the clutch chamber (18) has:

a first outlet opening (22) which is arranged at an 8 to 10 o'clock position, as viewed in a circumferential direction (24) of the transmission (10), and is provided for direct return of the transmission oil into the transmission housing base area; and a second outlet opening (26) which is arranged at a 2 to 4 o'clock position, as viewed in the circumferential direction (24) of the transmission (10), and is provided for a return flow of the transmission oil into the transmission housing base area;

wherein the clutch chamber (18) has an elliptical outer contour (28, 30) in a region between 12 to 2 or 4 o'clock and a region between 6 to 8 or 10 o'clock.

2. The transmission (10) according to claim 1, wherein a respective oil rib (32, 34) for separating a respective oil flow, which flows through the respective outlet opening (22, 26), is assigned to the respective outlet opening (22, 26).

3. The transmission (10) according to claim 1, wherein a respective channel is connected to the respective outlet opening (22, 26).

4. The transmission (10) according to claim 3, wherein the respective channel has a longitudinal region tapered in a transmission oil flow direction.

5. The transmission (10) according to claim 3, wherein the respective channel has a longitudinal region expanding in the transmission oil flow direction.

6. The transmission (10) according to claim 1, wherein the first outlet opening (22) is arranged geodetically above a balance differential in an installation position of the transmission (10) and wherein an oil path runs around the balance differential back into the oil sump.

7. The transmission (10) according to claim 1, wherein the transmission housing (12) has a stepped contour with rounded step edges on an outside of the second outlet opening (26) in a region of an oil path back into the oil sump.

8. The transmission (10) according to claim 1, wherein an oil path guided by a housing after the first and second outlet openings (22, 26) back into the oil sump is at least 10 millimeters.

* * * * *